June 17, 1969 A. B. AMIDON ET AL 3,450,531

ADHESIVE IMAGING ON PHOTOCHROMIC LAYERS

Filed Sept. 3, 1965

INVENTORS.
CARL BRYNKO
ALAN B. AMIDON
BY Ronald Zibelli
James J. Ralabate
ATTORNEYS 3,450,531

ADHESIVE IMAGING ON PHOTOCHROMIC LAYERS

Alan B. Amidon, Penfield, and Carl Brynko, West Webster, N.Y., assignors to Xerox Corporation, Rochester, N.Y., a corporation of New York Filed Sept. 3, 1965, Ser. No. 485,052
Int. Cl. G03c 5/04
U.S. Cl. 96—27 12 Claims

ABSTRACT OF THE DISCLOSURE

A photograph is formed by exposing an imaging layer comprising an organic photochromic material to actinic electromagnetic radiation of sufficient energy to convert the photochormic material from one photochromic state to another, softening the imaging layer to form a latent adhesive image, and developing the latent adhesive image with a marking material which adheres only to the adhesive areas of the imaging layer.

This invention relates in general to a novel imaging system and, more specifically, to an imaging system employing light induced changes in the surface properties of organic photochromic compounds contained in an imaging member.

Materials which undergo reversible photo-induced color change are referred to as photochromic. In the absence of actinic radiation these materials have a relatively stable configuration with a characteristic absorption spectrum. However, when a photochromic material is exposed to actinic radiation such as ultraviolet light, the absorption spectrum changes drastically so that the appearance of the material changes from colorless to red, red to green or the like. These property changes are believed to occur because of changes in the molecular or electronic configuration of the material from a lower to a higher energy state. These changes occur because the photochromic materials generally have very efficient routes for the internal conversion of absorbed excited state electronic energy into vibrational and torsional twisting modes of the molecule upon exposure to light. This conversion may, for example, result in the isomerization of the molecule. The conversion of each molecule normally takes place at an extremely rapid speed but actual observation of a change in color in conventional systems takes longer because of the relatively low concentration produced per unit time and the depletion of the excited colored form by the competing but slower reconversion to the lower unexcited form. Accordingly, photochromic materials of lower conversion efficiency tend to produce pale color changes at best.

Unfortunately, the higher, colored form of the photochromic material exists in an excited, unstable condition which reverts to the lower form with its original absorption band and color after the source of actinic radiation is removed. Since imaging techniques proposed in the prior art employ the color change to make the image, these materials cannot be used in permanent imaging systems. Although an enormous amount of time, money and effort has been expended by many research organizations on attempting to stabilize the higher forms of a great many different photochromic compounds so as to make them suitable for use in practical imaging systems and, although some success has been achieved in slowing down the reconversion of the higher to the lower form of some photochromic compounds with various modifications of their substituents, no one has to date yet succeeded in permanently stabilizing these higher forms. Additional effort has been devoted to the problem of achieving maximum color change from the lower to the higher form of various photochromic compounds, but even had these goals been achieved the problem of deactivating the lower form of photochromic material in background areas would still remain. In essence then, there have been two fixing problems in photochromic imaging involving both the stabilization of the higher colored form in exposed areas and the deactivation of the lower uncolored form in background areas of the image, and neither of these problems has been effectively solved. Consequently, the phenomenom of photochromism has remained largely a laboratory curiosity rather than an effective and commercially acceptable means of imaging.

It is accordingly an object of this invention to provide a novel imaging system.

It is a further object of the present invention to provide a novel imaging method based on the use of organic photochromic compounds.

Another object of this invention is to provide an imaging system which can effectively employ even those photochromic materials which exhibit little or no visible change in color on exposure.

A still further object of the invention is to provide an imaging method and apparatus utilizing photochromic compounds in which the image generated by image-wise exposure of the compound serves only as a temporary latent image for the developing and fixing steps which produce the permanent image that in no way depends upon the permanency of the higher form of the photochromic compound itself.

Yet another object of this invention is to provide a novel imaging method and apparatus in which photochromic compounds are employed in a photoadhesive imaging system.

The above and still further objects of the present invention are accomplished, generally speaking, by providing a system in which a layer of a photochromic compound is exposed to an image with actinic electromagnetic radiation. This exposure source may constitute a source of visible light, ultraviolet light, X-ray or any other radiation source which is capable of converting the particular photochromic compound from one form to the other. After image-wise conversion of at least a portion of the photochromic layer from one state to the other, the photochromic layer is softened with heat or a solvent vapor and because of the marked difference in contact angle (adhesiveness) between the two states of the same photochromic compound, a latent adhesive image is formed on the photochromic layer. It should be emphasized here that the exposure must only convert enough photochromic molecules to produce a significant difference between the adhesive properties of the exposed and unexposed areas. Because of the relatively small number of molecules which must be converted to fulfill this requirement with some materials, a visible color change need not necessarily be produced in all instances. The latent image on the photochromic layer is then developed by the deposition thereon of finely divided, colored particles or by contacting it with a structurally weak, colored stripout layer so that upon separation from the photochromic layer the stripout layer breaks leaving portions of the stripout layer conforming with the image pattern adhering to the photochromic layer. Although the developed image made by this process is very stable and permanent its permanency can be even further improved by laminating it or further softening it so that the colored material penetrates deeply into the photochromic layer.

The photochromic layer may be composed solely of one of more photochromic compounds providing that it has sufficient strength. For convenience, however, the photochromic material will generally be dissolved in solid solution or dispersed in a natural or synthetic resin. This resin may be thought of as a binder or matrix for the photochromic material. The use of such an insulating resin as a binder or matrix for the photochromic compound permits the choice of the photochromic compound to be made from an even larger group of materials including even those which have relatively low strength and poor film forming ability. Since many photochromic compounds are relatively expensive the use of the resin also serves to decrease the overall cost of the imaging layer.

In order that the invention will be more clearly understood, reference is now made to the accompanying drawings in which an embodiment of the invention is illustrated by way of example and in which.

Figure 1:
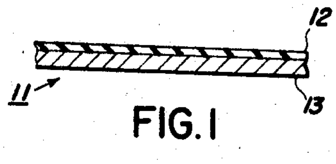
FIGURE 1 is a side sectional view of an imaging member made according to the invention.

Referring now to FIGURE 1, there is seen an imaging member generally designated 11 made up on a photoresponsive layer 12 on a supporting substrate 13. Any convenient material, such as copper, brass, aluminum, polyethylene terephthalate, polycarbonates, polyurethanes, glass or the like, may be employed to fabricate layer 13 so that the substrate will provide mechanical strength to the imaging member especially when it is softened for development. Imaging layer 12, may as stated above, consist entirely of a photochromic compound providing that it is strong enough to have structural integrity when coated.

Since most photochromic compounds are relatively expensive as compared with resins which are suitable for use in combination therewith and since some photochromics have low physical strength, the photochromic will generally be dissolved in or dispersed in a resin. Any suitable resin may be used. Typical insulating resins include Staybelite Ester 10 and Pentalyn H, pentaerythritol and glycerol esters, respectively of partially (50%) hydrogenated rosin sold by the Hercules Powder Co. of Wilmington, Delaware; Velsicol EL–11, a terpolymer of styrene, indene and isoprene, marketed by the Velsicol Chemical Co. of Chicago, Illinois; polyalpha-methyl styrene; Piccolyte S–70 and S–100 (polyterpene resins made predominantly from beta pinene available from the Pennsylvania Industrial Chemical Co. and having ring and ball melting points of 70° C. and 100° C., respectively); Piccopale 70SF and 85 (non-reactive olefin-diene resins, available from the Pennsylvania Industrial Chemical Co. having melting points of 70° C. and 85° C. and molecular weights of 800 and 100 respectively); Piccodiene 2212 (a styrene-butadiene resin available from the same company); Piccolastic A–75, D–100 and E–100 (polystyrene resins with melting points of 75° C., 100° C. and 100° C. available from the same company; Neville R–21, R–9 and Nevillac Hard (cumaroneindene resins); Amberol ST137X (an unreactive, unmodified phenolformaldehyde resin available from Rohm & Haas); ethyl cellulose; ethyl hydroxy cellulose; nitrocellulose; ethyl acrylate polymer; methyl acrylate polymer; methyl methacrylate polymer; Carboset XH–1 (an acrylic acid polymer available from B. F. Goodrich Co.); Aroclor 1242 (a chlorinated polyphenyl); Pliolite AC (a styrene-acrylate copolymer); Pliolite VTAC (a vinyl toluene-acrylate copolymer); and Neolyn 23 (an alkyd resin available from Hercules Powder Co.) chlorinated rubber; paraffin wax; polycarbonates; polyurethanes; epoxies; polyvinyl chlorides; polyvinylidene chloride; polyvinyl butyral; shellac; amine-formaldehydes; polyvinyl acetals; silicones; phenoxies; polyvinyl fluorides and mixtures and copolymers thereof.

As stated above, the percentage of photochromic compound in the imaging coating 12 may range anywhere from 100% by weight of photochromic compound down to about 1% by weight of photochromic with the remainder being a resin of the type described herein. Any suitable photochromic compound may be employed. Typical photochromic compounds include:

Spiropyrans such as 1,3,3-trimethyl-6′-nitro-8′-allyl-spiro (2′H-1′-benzopyran-2,2′-indoline);
1,3,3-trimethyl-5,6′-dinitro-spiro (2′H-1′-benzopyran-2,2′-indoline);
1,3,3-trimethyl-7′-nitro-spiro (2′H-1′-benzopyran-2,2′-indoline);
3-methyl-6-nitro-spiro-[2H-1-benzopyran-2,2′-(2′H-1′-beta-napthopyran)];
1,3,3-trimethyl-8′-nitro-spiro (2′H-1′-benzopyran-2,2′-indoline);
1,3,3-trimethyl-6′-methoxy-8′-nitro-spiro (2′H-1′-benzopyran-2,2′-indoline);
1,3,3-trimethyl-7-methoxy-7′ chloro-spiro (2′H-1′-benzopyran-2,2′-indoline);
1,3,3-trimethyl-5 chloro-5′ nitro-8′-methoxy-spiro (2′H-1′-benzopyran-2,2′-indoline);
1,3-dimethyl-3-isopropyl-6′ nitro-spiro (2′H-1′-benzopyran-2,2′-indoline);
1-phenyl-3,3-dimethyl-6′-nitro-8′-methoxy-spiro (2′H-1′-benzopyran-2,2′-indoline);
7′-nitro-spiro-xantho-10,2′ [(2′H-1′-benzobetanaphthopyran)];
3,3′-dimethyl-6′-nitro-spiro (2′H-1′-benzopyran-2,2′-benzothiazole);
3,3′-dimethyl-6′-nitro-spiro (2′H-1′-benzopyran 2,2′-benzo-oxazole);
1,3-trimethyl-6-nitro-spiro (2′H-1′-benzopyran-2,2′-indoline);
6′-nitro-8′-methoxy-1,3,3-trimethylindolinobenzopyrylospiran;
6-nitro-1,3,3-trimethylindolinobenzopyrylospiran;
8′-allyl-1,3,3-trimethylindolinobenzopyrylospiran;
8′-carbomethoxy-1,3,3-trimethylindolinobenzopyrylospiran;
8′-methoxy-1,3,3-trimethylindolinobenzopyrylospiran;
6′,8′-dinitro-1,3,3-trimethylindolinobenzopyrylospiran;
7′-nitro-1,3,3-trimethylindolinobenzopyrylospiran;
8′-nitro-1,3,3-trimethylindolinobenzopyrylospiran;
6′8′-dibromo-1,3,3-trimethylindolinobenzopyrylospiran;
6′-chloro-8′-nitro-1,3,3-trimethylindolinobenzopyrylospiran;
5-nitro-6′-nitro-1,3,3-trimethylindolinobenzopyrylospiran;
6′-nitro-8′-fluoro-1,3,3-trimethylindolinobenzopyrylospiran;
6′-methoxy-8′-nitro-1,3,3-trimethylindolinobenzopyrylospiran;
5′-nitro-8′-methoxy-1,3,3-trimethylindolinobenzopyrylospiran;
6′-bromo-8′-nitro-1,3,3-trimethylindolinobenzopyrylospiran;
anthrones such as bianthrone;
xanthylideneanthrone; 4,4′-methylanthrone;
4,4′-methoxy-bianthrone;
3-chloro-10-(9′-xanthylidene)-anthrone;
3-methyl-10-(9′-xanthylidene)-anthrone;
4′-chloro-10-(9′-xanthylidene)-anthrone; and
10′-9′-2′-methyl (xanthylidene)-anthrone;
sydnones such as N-(3-pyridyl)-sydnone;
N-benzylsydnone;
N-p-methylbenzyl-sydnone;
N-3, 4-dimethylbenzyl-sydnone;
N-p-chlorobenzylsydnone;
N,N′-ethylene-bissydnone; and
N,N′-tetramethylenebissydnone;
anils such as salicylidene aniline;
5-bromo salicylidene-alpha-naphthylamine;
salicylidene-m-phenylenediamine;

salicylidene-m-toluidene;
salicylidene 3,4-xylidene;
salicylidene-p-anisidine;
o-nitrobenzidene-p-aminobiphenyl;
o-nitrobenzidene-m-nitroaniline;
o-nitrobenzidene-p-phenetidine;
salicylidene-p-aminobenzoic acid;
p-hydroxy benzidene-p-bromoaniline;
p-hydroxybenzidene 2,4-xylidine 2-hydroxy-3-methoxybenzidene 2,5-xylidine; and
salicylidene-o-chloroaniline;
hydrazones such as the 2,4-dinitrophenylhydrazone of 5-nitro-salicylaldehyde;
benzaldehyde betanaphthyl-hydrazone;
benzaldehyde anislhydrazone, benzaldehyde-m-chlorophenylhydrazone, benzaldehyde-p-bromophenylhydrazone;
cinnamaldehyde phenylhydrazone;
cinnamaldehyde beta-naphthylhydrazone;
cinnamaldehyde m-tolylhydrazone;
cinnamaldehyde p-tolylhydrazone;
cinnamaldehyde 3,4-xylydrazone;
p-dimethylamino benzaldehyde beta-naphthylhydrazone;
2-furaldehyde beta-naphthylhydrazone;
1-phenol-1-hexen-3-one-phenylhydrazone;
piperonal anisylhydrazone;
piperonal m-chloro-phenylhydrazone;
piperonal beta-naphthylhydrazone;
piperonal m-tolylhydrazone;
p-tolualdehyde phenylhydrazone;
vanillin beta-naphthylhydrazone;
Osazones such as benzil beta-naphthyl-osazone;
benzil m-tolylosazone;
benzil 2,4-xylylosazone;
4,4′-dimethoxy benzil beta-naphthylosazone;
4,4′-dimethoxy benzil phenylosazone;
4,4′-dimethoxy benzil-2,4-xylylosazone;
3,4,3′4′-bis (methylenedioxy) benzil alpha-naphthylosazone;
3,4,3′,4′-bis(methylene-dioxy) benzil 2,4-xylylosazone;
semicarbazones such as chalcone semicarbazone;
chalcone phenyl semicarbazone;
2-nitrochalcone semicarbazone;
3-nitrochalcone semicarbazone;
cinnamaldehyde semicarbazone;
cinnamaldehyde thiosemicarbazone;
o-methoxy cinnamaldehyde semicarbazone;
o-methoxy cinnamaldehyde thiosemicarbazone;
o-methoxy cinnamaldehyde phenylsemicarbazone;
1-(4-methoxyphenyl)-5-methyl-1-hexen-3-one-semicarbazone;
1-(1-naphthyl)-1-hexen-3-one-semicarbazone;
1-phenyl-1-penten-3-one-semicarbazone;
stilbene derivatives such as 4,4-diformamido-2,2′-stilbene disulfonic acid;
4,4′-diacetamido-2,2′-stilbene disulfonic acid and its sodium, potassium barium, strontium, calcium, magnesium and lead salts;
4,4′-bis(4-acetamidobenzoyleneamido)-2,2′-stilbene disulfonic acid;
4,4′-bis(p-(p-acetamido-benzamido)benzamido)-2,2′-stilbene disulfonic acid;
fulgides (substituted succinic anhydrides) such as alpha-anisyl-gamma-phenyl fulgide;
alpha, gamma-dianisyl fulgide;
alpha, gamma-dicumyliso fulgide;
alpha, gamma-diphenyl fulgide;
alpha, gamma-distyryl fulgide;
alpha-piperonyl-gamma-phenyl fulgide;
tetraphenyl fulgide; amino-camphor compounds such as 3-(p-dimethyl aminophenylamino)-camphor and
3-(p-diethylaminophenylamino)-camphor;
thio indigo dyes;
o-nitrobenzyl derivatives such as 2-(2′,4′-dinitrobenzyl pyridine;
2,4,2′-trinitrodiphenylmethane;
2,4,2′,4′,2″,4″-hexanitro-triphenylmethane;
ethyl bis (2,4-dinitrophenyl) acetate;
2-(2′-nitro-4′-carboxybenzyl pyridine;
3,3′-dinitro-4,4′-bis (2-pyridylmethyl)-azoxybenzene; and
4-(2′-nitro-4′-cyano-benzyl pyridine.

The spiropyrans are, however, a preferred class of materials owing to their superior and more sensitive imaging capabilities. Whether photoresponsive layer 12 consists of a pure photochromic compound or a blend of a photochromic compound with a resin as described above, it may be coated on the substrate or formed into a self-supporting layer by a convenient technique such as dip coating, extrusion, whirl coating, casting or the like using either a hot melt or a solution of the materials to be coated.

Figure 2:
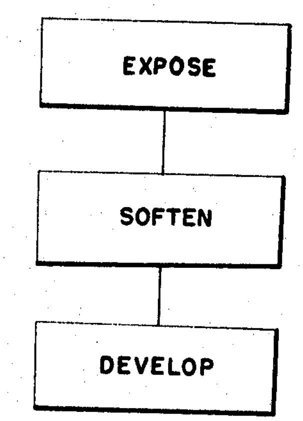
FIGURE 2 is a flow diagram of the process steps of the invention.

As shown in FIGURE 2 the basic steps involved in carrying out the process of this invention involve exposing the photoresponsive layer 12 of the imaging layer 11 to an image-wise pattern of actinin electromagnetic radiation, softening the exposed layer with heat or solvent vapor and developing this pattern to make it visible. In exposing to the image to be reproduced any source of electromagnetic radiation which is actinic to the photochromic material may be employed. In the case of most photochromic compounds in their lower or unexcited forms an ultraviolet radiation source may be conveniently employed to expose the material in image-wise configuration so as to convert exposed areas to the higher or excited form of the material, although light of this short wave-length is not always required. Since many photochromic materials in their higher or excited forms may be "triggered" or caused to revert to the lower unexcited form by exposure to visible light, a light source in the visible range (from about 4000–7500 angstrom units) may be conveniently employed for image-wise exposure of a photochromic film which had initially been uniformly converted to the higher or excited form. This type of exposure will then convert exposed areas to the unexcited or lower form of the photochromic material while the background or unexposed areas remain in the excited form. Providing that the image is developed before the background areas of the photochromic material revert to the lower unexcited form this technique may be conveniently employed for positive to negative imaging. The intensity of the exposure need not necessarily be strong enough to produce an intense color change in the photochromic compound since with most materials this requires a conversion of a gross amount of the photochromic from one form to the other, while to be operative in the process of this invention only enough photochromic material must be converted so that a differential adhesive pattern can be formed on imaging layer 12. The term "photochromic" should be understood in this context as it is used throughout the specification and claims.

Once exposure is complete the photochromic layer is softened to a point just prior to its transition to the liquid state either by heating or by subjecting it to a solvent vapor atmosphere. Depending on whether the higher or lower form of the particular photochromic compound employed has a lower surface energy and is more easily wettable, either a positive or negative latent adhesive image will be formed.

Any one of a number of techniques may be employed to develop the latent adhesive image produced by the exposure and softening steps. Thus, for example, colored powders such as carbon black, powdered metals, organic or inorganic pigment or any other suitable powdered materials may be rolled over the surface or applied as an aerosol or merely brought into surface contact with the imaging web 11. In a preferred development technique these powdered materials are applied forming a surface to which they lightly adhere so that they are not deposited on the imaging layer 11 in non-tacky areas by virtue or gravity or surface roughness on the imaging layer. This slight adherence to the carrier for the developer particles may be provided by loading the developer particles on a carrier or "donor" surface to which the particles have a slight degree of electrostatic adherence by virtue of triboelectrically induced attraction between the material of the particles and that of the donor. This type of donor loading for use in xerographic development is described, for example, in U.S. Patent 2,895,847 to Mayo. In another approach the developing material is combined with a weak binder and coated on a strong supporting substrate of a material such as aluminum foil or Mylar (polyethylene terphthalate) so that when this donor web is brought into contact with the latent adhesive image the binder layer contacted by tacky areas on imaging web 11 will be stripped away from the donor web. With this type of donor the colored "binder" layer may include the pigment particles or other colored particles, as described above, or may simply consist of a uniformly dyed layer of a poor film forming material.

Figure 3:
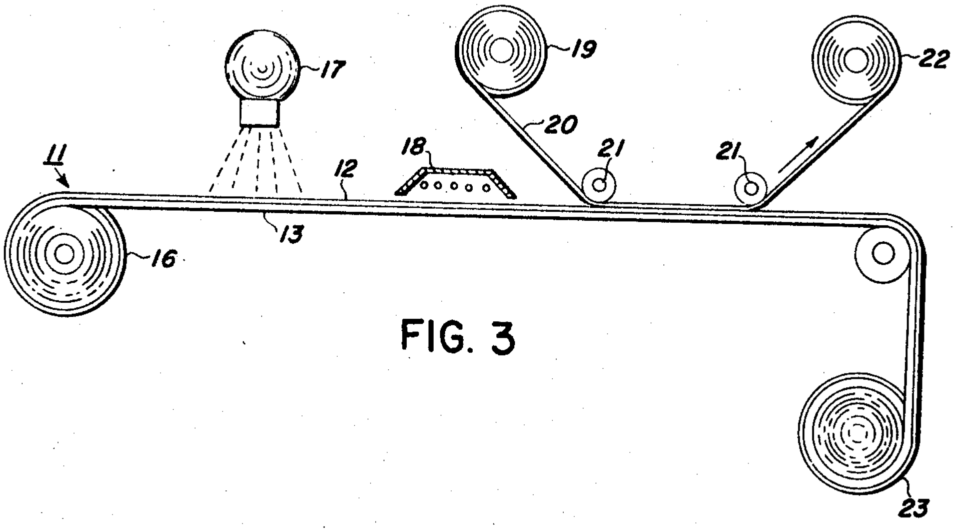
FIGURE 3 is a side sectional view of an illustrative embodiment of an apparatus adapted for imaging according to the invention.

In FIGURE 3 there is illustrated a simple exemplary apparatus for carrying out the imaging technique of the invention. In this apparatus imaging web 11 consisting of imaging layer 12 and substrate 13 comes off a supply roll 16 and passes under a projector 17 which projects a pattern of light and shadow corresponding to the image to be reproduced with an actinic light source on the photochromic layer 12 of the imaging web 11 so as to convert the photochromic material included therein from photochromic state to another in image-wise configuration. Following exposure imaging web 11 passes beneath a radiant heater 18 which softens the photochromic layer 12 of the imaging web to a point just beneath its melting point to form the latent adhesive image, as described above. A donor web 20 from the supply roll 19 is then brought into contact with the latent adhesive image on the imaging web and is pressed against it by rollers 21. The donor web is then separated from the imaging web 11 and rewound on a take-up reel 22. At the point of separation the tacky portion of the imaging web 11 pulls the developing material off the donor web 20 leaving behind on the donor web the developing material corresponding to non-tacky areas of the imaging web. In this way complementary images are formed on the imaging web and the donor web. Although the image on the donor web is wrong-reading, it may be easily read through the back of the donor web if this backing is transparent. The developed image on imaging web 11 is then rewound on take-up roll 23. The following illustrative examples of preferred embodiments of the invention are now given to enable those skilled in the art to more clearly understand and practice the invention described above. Unless otherwise indicated, all parts and percentages are taken by weight.

EXAMPLE I

Two grams of 6′-nitro-1,3,3-trimethylindolinobenzopyrylospiran and 4 grams of Amberol ST–137X resin (described above) are dissolved in 94 grams of toluene. This solution is dip coated in the dark to a thickness of about 1 micron on an aluminum plate and air dried. The dried film is then exposed to an image transparency with a 9-watt fluorescent light available from the Eastern Corporation of Westbury, N.Y. under the tradename "Blacklite" using a filter which passes about a 10 angstrom bandwidth centered on 3660 angstroms. After image-wise exposure a maroon colored image is seen to form on the film which is then heated to 84° C. and pressed against a donor of Mylar substrate coated with a layer of carbon black with just enough shellac binder to hold the particles together. As the donor is separated from the imaging layer the carbon black is left in the unexposed background areas producing a positive from the donor and a negative from the imaging film fused to form a high quality reproduction of the original. Ten additional duplicate images are formed without re-exposure by merely charging developing and transfer.

EXAMPLE II

The procedure of Example I is repeated except that the heating step is replaced by softening with toluene vapor with approximately the same results.

EXAMPLES III–IV

The procedure of Example I is repeated with the exception that in Example II 4 grams of the resin and ½ gram of the 6′-nitro-1,3,3-trimethylindolinobenzopyrylospiran are used in the coating solution while in Example IV the ratio is 1 gram of resin to 2 grams of the same photochromic spiran compound. Each of these produce about equal results with those produced by Example I.

EXAMPLES V–XVI

The procedure of Example I is followed exactly with the exception that the following resins are substituted for the Staybelite Ester resin of Example I in Examples V–XVI, repectively; Piccolyte S–70, Piccolyte S–100, Piccopale 70SF, Piccopale 85, Piccodiene 2212, alpha-methylstyrene polymer, Staybelite Ester 10, Piccolastic D–100, Piccolastic E–100, Neville R–9, Neville R–21, and Nevillac Hard. All produce about the same results as Example I.

EXAMPLES XVII–XXII

In Examples XVII and XVIII the procedure of Example I is repeated except that the photochromic compound employed is 3-N-pyridyl sydnone in Example XVII and phenyl sydnone in Example XVIII.

In Examples XIX–XXII the following photochromic compounds are employed. In Example XIX bianthrone is employed; in Example XX 9-xanthylidene anthrone is employed; in Example XXI the 2,4-dinitrophenylhydrazone of 5-nitro-salicylaldehyde is employed; and, in Example XXII 3-N-pyridyl salicylidene is employed. In these four examples the procedure of Example I is followed except that the same filter is employed with a 100 watt light source for a 20-minute exposure. In all instances the images formed are about equal in quality with the one produced by the procedure of Example I.

EXAMPLE XXIII

The procedure of Example I is repeated exactly except that the coated film is first uniformly exposed to the 3660 angstrom light source until it achieves a deep maroon color. Following this exposure a transparency to be reproduced is overlaid on the imaging layer and exposed to a source of yellow light for one hour which serves to bleach or reconvert the excited colored form of the photochromic compound back to its unexcited, colorless form in exposed areas. The softening and development steps of Example I are then carried out resulting in a photographic reversal of the original transparency.

EXAMPLES XXIV–XXX

The procedure of Example I is followed with the exception that the following photochromic compounds are used respectively, in Examples XXIV–XXX in place of the spiropyran photochromic compounds of Example I: 2,4-dinitro-phenylhydrazone; benzil beta-naphthylosazone; 2-nitrochalcone semicarbazone; alpha, gamma-diphenyl fulgide; 4,4′-diformamido-2,2′-stilbene disulfonic acid; 3-(p-dimethylaminophenylamino)-camphor; and 2-(2′,4′-dinitrobenzyl) pyridine. These produce essentially the same results as Example I when a 20 minute exposure is employed.

EXAMPLES XXXI–XXXVI

The procedure of Example I is repeated except that the following resins are substituted for the amberol resin in Examples XXXI–XXXVI, respectively; ethyl hydroxy cellulose; ethyl cellulose; nitrocellulose; polyethylacrylate; polymethylacrylate and polymethylmethacrylate. All produce the same results as Example I.

EXAMPLE XXXVII

The procedure of Example I is repeated exactly except that the imaging layer is not heated until after the donor is brought into contact with it following exposure. No difference is seen in the results thus produced.

EXAMPLE XXXVIII

The procedure of Example II is repeated exactly except that just prior to solvent vapor treatment of the exposed photochromic layer a mono layer of glass beads is laid down uniformly over the layer and it is then passed through a solvent vapor atmosphere. After evaporation of the solvent an air blast is applied to the imaging layer which dislodges all the beads covering the exposed area. Fixing is then accomplished by heating the imaging web and pressing the beads deeply into the softened web. This produces a light scattering image due to the difference in the index of refraction of the glass beads as compared with the matrix in which they are embedded.

Although specific materials and conditions are set forth in the above examples, these are merely illustrative of the present invention. Various other materials, such as any of the typical photochromic and/or insulating resins listed above which are suitable, may be substituted for the materials listed in the examples with similar results. The films of this invention may also have other materials mixed, dispersed, copolymerized or otherwise added thereto to enhance, sensitize, synergize or otherwise modify the properties thereof. For example, sensitizers which accelerate the conversion of photochromic compounds from one photochromic state to the other which are suitable for use herein may be employed. In addition the process steps need not necessarily be carried out in the sequence given. Thus, for example, the layer of developing material may be contacted with the imaging web before it is softened. Many modifications and/or additions to the process will readily occur to those skilled in the art upon reading this disclosure, and these are intended to be encompassed within the spirit of the invention.

What is claimed is:

1. A photographic method comprising exposing an imaging layer including an organic photochromic material to a pattern to be reproduced with an actinic electromagnetic radiation source of sufficient energy to convert at least a portion of said material from one photochromic state to another, softening said imaging layer to and just below its liquid state to form a latent adhesive image and developing said imaging layer with a marking material.

2. A method according to claim 1 in which said photochromic material is initially in its lower, unexcited state including exposing said imaging layer with an electromagnetic radiation source of sufficient energy to convert exposed areas thereof to a higher excited photochromic state.

3. A method according to claim 1 in which said photochromic material is initially in its higher excited state including exposing said imaging layer with an electromagnetic radiation source of sufficient energy to convert exposed areas thereof to a lower unexcited photochromic state.

4. A method according to claim 3 including exposing said imaging layer to a pattern to be reproduced with a visible light source capable of causing said photochromic material to return to the lower unexcited state in exposed areas.

5. A method according to claim 1 in which said marking material is made up of fine colored particles.

6. A method according to claim 1 in which said developing material is made up of a structurally weak colored film on a supporting substrate.

7. A photographic method comprising exposing an imaging layer comprising a photochromic 1,3,3-trimethylindolinobenzopyrylospiran material to a pattern to be reproduced with an actinic electromagnetic radiation source of sufficient energy to convert at least a portion of said material from one photochromic state to another, softening said imaging layer to form a latent adhesive image, in said imaging layer and developing the latent image with a marking material, which will adhere only to tacky areas of said imaging layer.

8. A method according to claim 7 in which said photochromic material comprises 6′-nitro-1,3,3-trimethylindolinobenzopyrylospiran.

9. A photographic method comprising exposing an imaging layers comprising a solid solution of an insulating resin and an organic photochromic material to a pattern to be reproduced with an actinic electromagnetic radiation source of sufficient energy to convert at least a portion of said material from one photochromic state to another, softening said imaging layer to form a latent adhesive image and developing the latent image with a particulate marking material.

10. A photographic method comprising exposing an imaging layer comprising from about 1 part by weight of photochromic material to about 8 parts by weight of resin to about 1 part by weight of photochromic material to about ½ part by weight of resin to a pattern to be reproduced with an actinic electromagnetic radiation source of sufficient energy to convert at least a portion of said material from one photochromic state to another, softening said imaging layer to form a latent adhesive image and developing said latent image with a particulate marking material.

11. A photographic method comprising exposing an imaging layer comprising a solid solution of a resin and 6′-nitro - 1,3,3 - trimethylindolinobenzopyrylospiran to a pattern to be reproduced with an actinic electromagnetic radiation source of sufficient energy to convert at least a portion of said 6′-nitro-1,3,3-trimethylindolinobenzopyrylospiran from one photochromic state to another, softening said imaging layer to form a latent adhesive image and developing said latent image with a particulate marking material.

12. A photographic method comprising exposing an imaging layer comprising a solid solution of an organic photochromic material and a resin to a pattern of actinic electromagnetic radiation of sufficient energy to convert at least a portion of said photochromic material from one photochromic state to another thereby altering the surface energy of said imaging layer in conformance to said pattern, applying sufficient solvent to said imaging layer to selectively soften said imaging layer in accordance with said pattern and developing the softened areas of said imaging layer with particulate marking material.

References Cited

UNITED STATES PATENTS

| | | | |
|---|---|---|---|
| 3,149,120 | 9/1964 | Berman | 96—67 XR |
| 3,236,647 | 2/1966 | Philipot | 96—67 XR |

NORMAN G. TORCHIN, *Primary Examiner.*

J. R. EVERETT, *Assistant Examiner.*

U.S. Cl. X.R.

96—35, 90